UNITED STATES PATENT OFFICE 2,687,406

4-VINYLCYCLOHEXENE MONOEPOXIDE AND POLYMERS THEREOF

Robert E. Foster, New Castle, Del., assignor to E. I. du Pont de Nemours and Company, Wilmington, Del., a corporation of Delaware No Drawing. Application July 5, 1951, Serial No. 235,361

3 Claims. (Cl. 260—88.3)

This invention relates to a new chemical compound and to polymers thereof. More particularly, this invention relates to a new polymerizable compound containing both a vinyl group and an epoxy group and to its polymers.

Polymeric epoxides, i. e., polymers containing epoxy groups

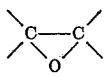

also called oxirane groups, are becoming increasingly important in the chemical industry. These polymers are capable of reacting through their epoxy groups with various reagents such as amines or acids, e. g., phosphoric acid, to give products which, depending upon the reagent and the experimental conditions, may either retain their original linearity or become cross-linked and therefore insoluble and infusible. These modified epoxy polymers are finding important uses in such fields as textile sizing, finishes for metal and other surfaces, treatment of leather and in other applications.

Polymeric epoxides may be obtained through vinyl-type addition polymerization of epoxy monomers containing ethylenic unsaturation, an example of such monomer being allyl glycidyl ether. However, there are very few known monomers containing an epoxy group and a vinyl group.

It is an object of this invention to provide a new chemical compound and polymers thereof. A further object is to provide a new polymerizable carbocyclic monomer containing as the sole substituents one vinyl group and one epoxy group. A still further object is to provide new vinyl epoxy monomers from readily available materials. Another object is to provide polymers of a vinyl epoxy compound which retain the epoxy group in the polymer. Other objects will appear hereinafter.

The objects of this invention are accomplished by providing the new chemical compound 4-vinylcyclohexene monoepoxide and its polymers. This new chemical compound, 4-vinylcyclohexene monoepoxide, has the formula

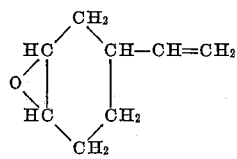

4-vinylcyclohexene monoepoxide is prepared by reacting 4-vinylcyclohexene with a peracid such as peracetic acid. This converts the "internal" double bond, that is the double bond of the cyclohexene ring, to an oxirane group and leaves the "external" double bond unaffected. The resulting 4-vinylcyclohexene monoepoxide is obtained in good yields as a distillable liquid which can be polymerized by means of free radical-producing catalysts to vinyl polymers containing epoxide groups. If desired, these polymers can be cross-linked by means of acidic catalysts which open the epoxy groups. Conversely, 4-vinylcyclohexene monoepoxide can be first polymerized in the presence of ionic catalysts, e. g., acids, to give polymers of the polyethylene oxide type which do not contain epoxy groups except possibly as end groups, and these polymers can be further polymerized through their vinyl groups.

It is known that 4-vinylcyclohexene can be converted to a diepoxide, i. e., a compound in which both double bonds have been converted to epoxy groups (see, for example U. S. Patent 2,527,806). The fundamental difference between this diepoxide and the monoepoxide of this invention resides in the fact that polymerization of the diepoxide, which is possible through the use of ionic catalysts, proceeds through opening of both epoxy groups and therefore leads to polymers which no longer contain epoxy groups and thus do not possess the technical advantages of the polymers of this invention. On the other hand, 4-vinylcyclohexene monoepoxide can be polymerized through its vinyl group by means of free-radical producing catalysts (which are incapable of polymerizing the diepoxide) and the resulting polymers contain one epoxy group per monomer unit.

The invention is illustrated in greater detail by the following examples, in which parts are by weight unless otherwise noted.

Example I

A solution of 22.2 parts of perbenzoic acid in 222 parts of chloroform was mixed with 17.3 parts of 4-vinylcyclohexene while cooling externally by means of an ice bath. The reaction mixture was stored at 2–3° C. for 65 hours, by which time a spot test with acidified potassium iodide solution indicated the absence of peroxides. The chloroform solution was then extracted with 50 parts of a 25% aqueous solution of sodium hydroxide, dried over anhydrous magnesium sulfate and distilled. There was obtained 10.8 parts (55% yield) of 4-vinylcyclohexene monoepoxide, B. P. 53–59° C. at 10 mm. pressure.

Analysis.—Calculated for C₈H₁₂O: C, 77.37; H, 9.74. Found: C, 78.84; H, 9.80.

Example II

A reaction vessel was charged with 216 parts (2 moles) of 4-vinylcyclohexene, 1200 parts of benzene and 405 parts of sodium bicarbonate. The mixture was stirred vigorously and was cooled externally until the internal temperature fell at 10° C. To the stirred mixture maintained at 10-15° C. was then added gradually 285 parts of a 40% solution of peracetic acid in acetic acid, amounting to 114 parts (1.5 moles) of peracetic acid, after which the reaction mixture was stirred with cooling for six hours, then poured into 4000 parts of water. The benzene layer was separated, washed once with water, dried over anhydrous magnesium sulfate and distilled under reduced pressure. The various fractions obtained as distillates included 30 parts of unreacted 4-vinylcyclohexene (B. P. 23-25° C. at 14 mm.) and 105.5 parts of 4-vinylcyclohexene monoepoxide (B. P. 49-51° C. at 8-9 mm., $n_D^{25}$ 1.4680). This corresponds to a 57% yield based on the peracetic acid.

Analysis.—Calculated for C₈H₁₂O: C, 77.37; H, 9.74; O, 12.89. Found: C, 77.7; H, 9.8; oxygen (by oxirane oxygen determination) 12.5.

In addition to analysis, other indications that the compound has the 4-vinylcyclohexene monepoxide structure are furnished by the method of preparation and by infrared spectra, which showed absorptions at three wave lengths characteristic of a terminal unsaturated group.

Example III 4-vinylcyclohexene monoepoxide was polymerized in two stages by first heating the monomer with 0.1% perchloric acid as catalyst at 100° C. for 8 hours. This resulted in opening of the epoxy group to give a polymer which was a very viscous oil. This was further polymerized through the vinyl groups by adding about 0.01% of 1,1'-azodicyclohexanecarbonitrile as catalyst and heating at 100° C. for 15 hours. The resulant polymer was a soft yellowish gel, insolube in organic solvents. Similar results were obtained using antimony trichloride as the catalyst for the first stage.

Example IV 4-vinlycyclohexene monoepoxide was first subjected to vinyl polymerization, then to polymerization through the epoxide groups as follows:

A mixture of 7 parts of 4-vinylcyclohexene monoepoxide and 0.3 part of 1,1'-azodicyclohexanecarbonitrile was heated at 100° C. for 13 hours. The unchanged monomer was removed by distillation under reduced pressure, and the residue was heated at 80° C. under 1 mm. pressure for several hours to remove the last traces of monomer. There was obtained a highly viscous polymer having a molecular weight of about 500, and in which at least part of the epoxide groups were still intact, as shown by its oxirane oxygen content of 5.37%.

One part of this polymer, which was soluble in the common organic solvents, was dissolved in 10 parts of benzene, and to this solution was added 0.01 part of sulfuric acid dissolved in 0.1 part of acetic acid. A precipitate formed immediately and increased in amount as the mixture was refluxed for 3 hours. There was obtained 0.4 part of a solid polymer insoluble in the solvents which dissolved the original polymer.

In the preparation of the monomeric 4-vinylcyclohexene monoepoxide, other percarboxylic acids can be used besides those shown in the examples, such as monoperphthalic, performic and perpropionic acids, although peracetic and perbenzoic acids are the most readily available of such materials. The relative proportions of peracid and 4-vinylcyclohexene are not critical but the best yields are obtained (based on the peracid) when there is used between 0.5 and 1 mole of peracid per mole of vinylcyclohexene. When a higher proportion of peracid is used, there is formed varying amounts of the diepoxide. Since the percarboxylic acids are preferably stored and handled in solution, it is preferable to carry out the reaction in a solvent, which is conveniently but not necessarily the same as that in which the peracid is dissolved. Any inert, aliphatically saturated organic solvent may be used, e. g., tetrachloroethane, dioxane, toluene, and the like. The reaction temperature is preferably kept below about 25-30° C. since the reaction is exothermic. Moreover, a relatively low temperature during the epoxidation reaction is desirable to avoid reaction of the epoxide with the organic acid generated, since this side reaction produces esters and decreases the yield. The reaction may be considered terminated when a test shows substantial absence of peroxides. The product is conveniently isolated by fractional distillation, with or without previous neutralization, washings or other preliminary procedures.

As has been shown, polymerization of 4-vinylcyclohexene monoepoxide can proceed to give either or both types of addition polymers, those formed by opening of the oxirane ring and those formed by opening of the vinyl groups, and also cross-linked structures in which both types are present. As is known, the first type of polymerization, i. e., opening of the oxirane ring, is favored by the use of ionic catalysts such as hydrochloric acid, sulfuric acid, perchloric acid, phosphoric acid, zinc chloride, ferric chloride, boron trifluoride, p-toluenesulfonic acid, sodium hydroxide, alkali metal alkoxides, quaternary ammonium hydroxides, and the like.

Vinyl polymerization is preferably catalyzed by free radical-producing initiators such as the inorganic and organic peroxides, e. g., hydrogen peroxide, benzoyl peroxide, tert. butyl hydroperoxide, lauroyl peroxide, and the recently developed azonitrile initiators of U. S. Patent 2,471,959. Polymerization may be also initiated by ultraviolet light irradiation in the presence of photopolymerization catalysts such as uranyl nitrate, benzoin and the like. By the proper choice of initiators and polymerization conditions, it is thus possible to prepare polymers containing solely the unit

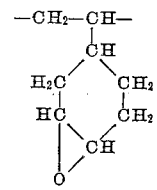

or polymers containing solely the unit

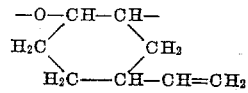

The first type of polymers is the more generally useful one.

Monomeric 4-vinylcyclohexene monoepoxide, in addition to its usefulness as a starting material for the preparation of technically valuable polymers, has many other uses deriving from the fact that it possesses two reactive functions. For example, it reacts through the epoxy group with various compounds, e. g., with mono- or dicarboxylic acids or anhydrides to give esters, with alcohols to give ethers, with water and with various reactive compounds such as amines, thiols, and other compounds containing reactive groups. The polymers of 4-vinylcyclohexene monoepoxide, in addition to the uses already mentioned, have the general usefulness of resinous materials in coating, impregnating or molding compositions, with the further advantage that they are capable of being cross-linked to insoluble, water- and solvent-resistant products.

As many apparently widely different embodiments of this invention may be made without departing from the spirit and scope thereof, it is to be understood that this invention is not limited to the specific embodiments thereof except as defined in the appended claims.

I claim:

1. A polymer of 4-vinylcyclohexene monoepoxide consisting solely of the recurring structural units selected from the class consisting of

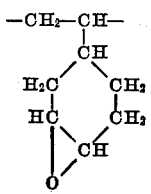

and

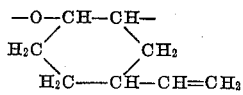

2. A polymer of 4-vinylcyclohexene monoepoxide containing epoxy groups and consisting solely of the recurring structural units

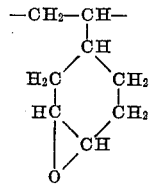

3. A polymer of 4-vinylcyclohexene monoepoxide consisting solely of the recurring structural units

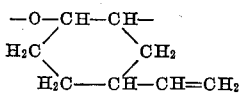

References Cited in the file of this patent

UNITED STATES PATENTS

| Number | Name | Date |
|---|---|---|
| 2,152,003 | Van Peski et al. | Mar. 28, 1939 |
| 2,460,195 | Segall | Jan. 25, 1949 |
| 2,527,806 | Foster | Oct. 31, 1950 |